Feb. 19, 1929.
R. E. HAIRE
1,702,940
METHOD OF TREATING GYPSUM
Filed May 22, 1924
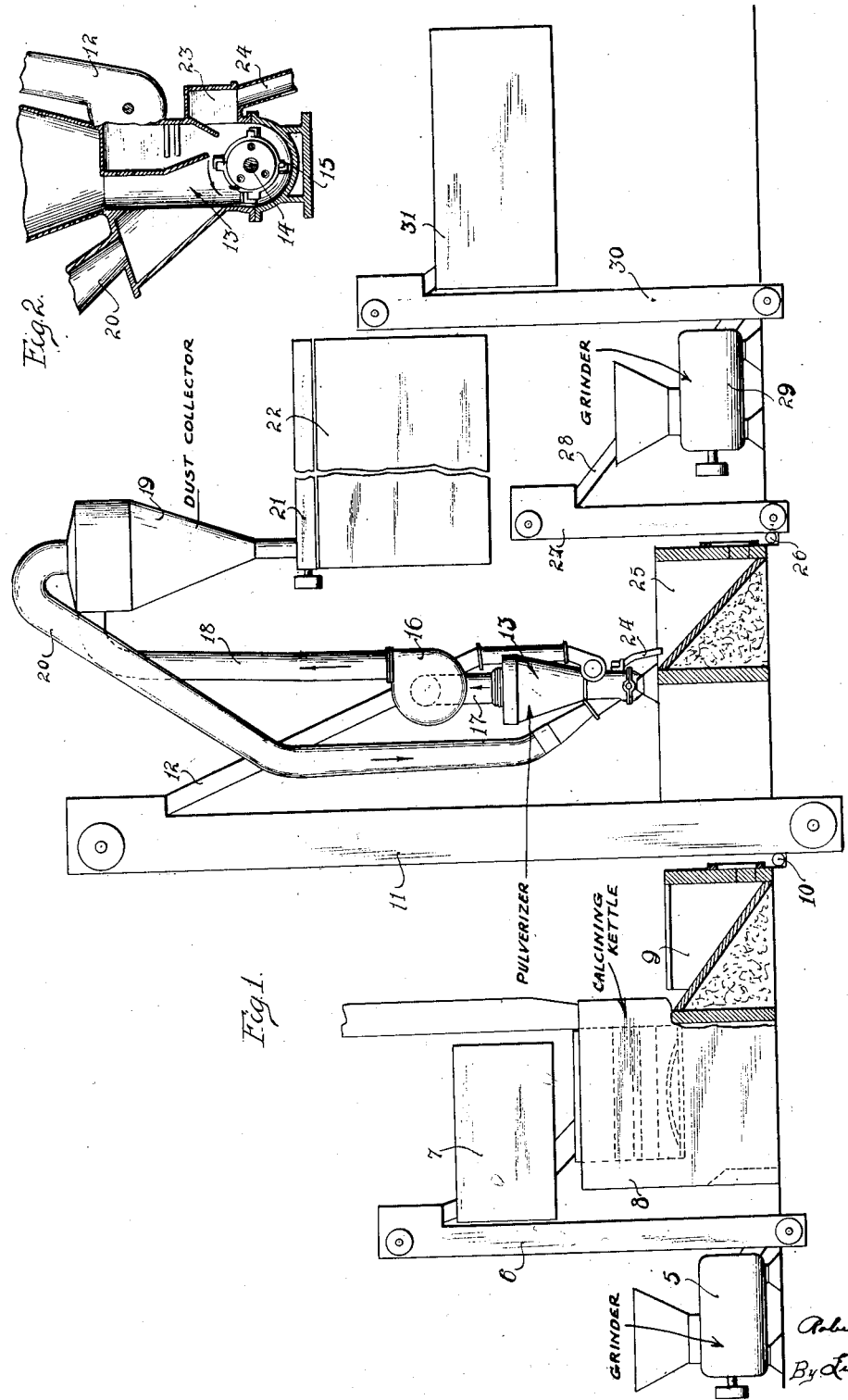

Patented Feb. 19, 1929.

1,702,940

UNITED STATES PATENT OFFICE.

ROBERT E. HAIRE, OF PARIS, ONTARIO, CANADA.

METHOD OF TREATING GYPSUM.

Application filed May 22, 1924. Serial No. 715,009.

My invention relates to an improved method of treating gypsum.

Many deposits of gypsum bearing rock are what may be termed low-grade, that is to say, they contain a considerable percentage of mineral impurities or foreign matter such as dolomitic lime, calcium carbonate, magnesium carbonate and silicates. When gypsum from such deposits is used as it comes from the mine, the resultant substance is inferior to substantially pure gypsum and it is not satisfactory for use in making products such as plaster of Paris, neat hardwall plaster and the like which require gypsum substantially free of impurities. The aforesaid inferior substance, therefore, cannot be sold in competition with substantially pure gypsum. Inasmuch as the uses to which the inferior manufactured product may be put are limited, its market value is only from five to eight dollars per ton, while manufactured substantially pure calcined gypsum brings from ten to twelve dollars per ton. It is one of the objects of my invention to obtain from low-grade gypsum bearing rock a product substantially free of all impurities or foreign matter and suitable for use for all purposes substantially pure calcined gypsum can be used, which product may, therefore, be sold in direct competition with calcined gypsum obtained from deposits containing only a negligible amount of impurities.

It is another object of my invention to recover in the manufacture of substantially pure calcined gypsum from low-grade material as aforesaid, a by-product which will be suitable as a base for the manufacture of such products as sanded hardwall plaster.

In obtaining substantially pure calcined gypsum from low-grade gypsum deposits I preferably comminute the raw gypsum ore to a moderate degree of fineness and then calcine the comminuted material. Calcination of the material reduces the major portion of the gypsum content to a disintegrated state but it leaves the impurities, which are harder and not as easily ground, in a relatively coarse state with some of the gypsum adhering to or contained in the small particles of foreign matter. The calcined material is then treated in such manner that the fine disintegrated gypsum is separated from the residue of the calcined material, which is preferably done by agitating the calcined material, for example, by subjecting it to a mechanical shaking or beating action in an enclosed space in the presence of air suction so that the fine and softer substantially pure gypsum is reduced to a powder and is carried away in the air current to a place of deposit, leaving the residue of the calcined material in a relatively coarse or granular state as a by-product suitable as a base for making a product similar to ordinary sanded hardwall plaster ond other products of the same general class.

A further object of my invention is the provision of an improved method whereby the gypsum products aforesaid may be manufactured from low-grade gypsum ore expeditiously and at a minimum expense.

My invention will be better understood from the following description of a preferred embodiment thereof taken in connection with the accompanying drawings wherein is illustrated a preferred form of apparatus suitable for practicing it, and in which—

Fig. 1 is a diagrammatic elevational view of the apparatus; and

Fig. 2 is a detailed view being substantially a vertical section, on an enlarged scale, of the chamber into which the calcined low-grade gypsum is passed so that the fine gypsum may be separated from the residue of the calcined material.

Like characters of reference designate like parts in both views.

Referring now to the accompanying drawings, the gypsum ore as it comes from the mine is comminuted in a grinder 5, the comminuted material being delivered by an elevator 6 into a bin 7. The bin 7 is located so that the material may flow therefrom into a calcining kettle 8, the calcined material being discharged from the kettle into a receiving bin 9. A screw conveyor 10 receives the calcined material and delivers it to an elevator 11, the latter having a feed chute 12 leading to the receiving compartment of a pulverizer 13. The pulverizer is provided with a shaft 14 which carries a plurality of beater blades 15. An exhaust fan 16 is connected by conduits 17 and 18, respectively, with the pulverizer 13 and a dust collector 19. A conduit 20 leads from the dust collector back to the pulverizer. The dust collector is arranged so that the material collected therein may discharge into a screw conveyor 21 positioned over a storage bin 22. The pulverizer is provided with a compartment 23 located to one side and which is equipped with a discharge chute 24 leading to a receiving bin 25. The material discharging from the bin 25 is received by a screw conveyor 26 and delivered to an elevator 27, the latter having a discharge chute 28 leading to the hopper of a comminuter 29. The comminuter 29 discharges the ground material into an elevator 30 which delivers it to a storage bin 31.

Operation: The raw gypsum ore as it comes from the mine is placed in the hopper of the grinder 5 and is comminuted to a moderate degree of fineness, say, for example, to such a size that 90 per cent of the mass will pass through a 40 mesh screen. The comminuted material, after being calcined, is delivered by the feed chute 12 into the receiving compartment of the pulverizer 13. As the material flows from the receiving compartment it is struck by the rapidly revolving beater blades 15 which reduce the soft, disintegrated, substantially pure calcined gypsum to a powdered state and render it susceptible to the action of the air current, the relatively coarse and hard particles of foreign matter remaining in a relatively coarse or granular state and being thrown into the compartment 23 of the pulverizer and discharged into the receiving bin 25. The fan 16 causes air to circulate continuously through the conduits 17, 18 and 20 and in the direction indicated by the arrows thereon. The air current carries the fine, pure gypsum into the dust collector from which it is discharged and conveyed into the storage bin 22.

The pure calcined gypsum obtained in the manner described from the low-grade ore is equal to the calcined gypsum obtained from the very best deposits. The calcined gypsum obtained as aforesaid is substantially freed of all foreign matter and brings the highest market price, and it can be successfully used for making plaster of Paris, neat hardwall plaster and all other products which require gypsum substantially free of impurities.

Some calcined gypsum adheres to or is contained in the small particles of foreign matter discharged from the pulverizer and some of such calcined gypsum may be in a granular state due to various chemical changes resulting from such causes as the absorption of lime water or the like by the gypsum. Such calcined gypsum, obviously, will not be susceptible to the action of the air current and is consequently discharged as a part of the by-product. Grinding the by-product not only further reduces the fineness of the foreign matter but it frees and breaks up at least a part of the calcined gypsum adherent to or contained in the particles of foreign matter and also breaks up a part at least of whatever calcined gypsum there may be in a granular state, thus better converting the by-product into a valuable base material. In this way sufficient of the gypsum content of the by-product is reduced to a fine state to provide a cementitious binder, when mixed with a liquid agent such as water, for the other portion of the by-product. The comminuted substance by the addition of a suitable fiber, such as hair, together with a suitable retarder and water makes in effect a sanded hardwall plaster. The extent of the grinding of the mass by the comminuter 29 will of course be regulated by reference to the amount of free gypsum it is desired to have in the plaster.

It will be apparent from the foregoing specification that all of the low-grade gypsum ore is utilized in the manufacture of valuable products to the best possible economic advantage.

I do not intend to limit my invention to the details of construction and the detail steps of manufacture shown and described, except only in so far as certain of the appended claims are specifically so limited, as it will be obvious to those skilled in the art that various modifications and changes therein may be made without departing from the principles of my invention.

I claim:

In the method of treating low grade gypsum rock for producing as a by-product a sanded base for sanded hard wall plaster after calcination and separation of the commercially pure gypsum, the step of subjecting the mass of harder and coarser particles constituting the residue to further grinding to produce the product which contains a quantity of released gypsum with the impurities from the rock in a finely divided state.

ROBERT E. HAIRE.